(12) United States Patent
Greig

(10) Patent No.: US 8,228,762 B2
(45) Date of Patent: Jul. 24, 2012

(54) MAGNETIC MASS-LIFT IMPULSIVE SEISMIC ENERGY SOURCE INCLUDING ATTRACTING AND REPULSING ELECTROMAGNETS

(75) Inventor: Malcolm John Greig, Sugar Land, TX (US)

(73) Assignee: Geokinetics Acquisition Company, Houston, TX (US)

(*) Notice: Subject to any disclaimer, the term of this patent is extended or adjusted under 35 U.S.C. 154(b) by 245 days.

(21) Appl. No.: 12/462,643

(22) Filed: Aug. 6, 2009

(65) Prior Publication Data
US 2011/0032797 A1 Feb. 10, 2011

(51) Int. Cl.
*G01V 1/143* (2006.01)
*G01V 1/04* (2006.01)
(52) U.S. Cl. .................. 367/189; 181/121; 181/113
(58) Field of Classification Search ............ 181/113, 181/121; 367/189
See application file for complete search history.

(56) References Cited

U.S. PATENT DOCUMENTS

| | | | | |
|---|---|---|---|---|
| 3,302,744 | A | * | 2/1967 | Lemm ............... 181/121 |
| 4,205,731 | A | * | 6/1980 | Cholet et al. ........... 181/121 |
| 4,773,501 | A | * | 9/1988 | Dedole et al. .......... 181/121 |
| 4,821,246 | A | * | 4/1989 | Van Kampen et al. .... 181/121 |
| 2009/0073807 | A1 | | 3/2009 | Sitton et al. |

FOREIGN PATENT DOCUMENTS

| | | |
|---|---|---|
| EP | 0 245 909 A1 | 11/1987 |
| EP | 0 168 145 A2 | 1/1996 |
| RU | 2 028 646 | 2/1995 |
| RU | 2 053 525 | 1/1996 |
| RU | 2 171 478 | 7/2001 |
| SU | 868668 | 9/1981 |
| SU | 996966 | 2/1983 |
| SU | 1106551 A | 8/1984 |
| SU | 1125567 | 11/1984 |

OTHER PUBLICATIONS

PCT International Search Report and Written Opinion of Intern'l Searching Authority, PCT/US2010/002137, (corresponding to U.S. Appl. No. 12/462,643), Dec. 14, 2010.

* cited by examiner

*Primary Examiner* — Ian Lobo
(74) *Attorney, Agent, or Firm* — Karen Bryant Tripp

(57) ABSTRACT

A seismic energy source includes a base plate and a block fixedly coupled in a frame. The base plate is configured for contact with a part of the Earth's subsurface to be seismically energized. The frame has a first electromagnet associated therewith. A second electromagnet is disposed in a travelling reaction mass, which is movably disposed in the frame between the first electromagnet assembly and the top block. The reaction mass includes at least a third electromagnet associated therewith. The source has circuits for selectively energizing the first, second and at least a third electromagnets, and which are configured to energize the first and second electromagnets to repel each other such that the traveling reaction mass is lifted from the first electromagnet, and configured to energize the at least a third electromagnet after a selected delay time to cause attraction between the traveling reaction mass and the top block.

4 Claims, 3 Drawing Sheets

MAGNETIC MASS-LIFT IMPULSIVE SEISMIC ENERGY SOURCE INCLUDING ATTRACTING AND REPULSING ELECTROMAGNETS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic energy sources. More particularly, the invention relates to impulsive seismic energy sources using electromagnets to move a mass.

2. Background Art

Seismic surveying includes imparting seismic energy from a seismic energy source into rock formations below the land surface, or below the bottom of a body of water in marine environments. The seismic energy travels from the source, through the rock formations and is reflected from acoustic impedance boundaries in the subsurface. Such acoustic impedance boundaries are typically at the interfaces of layers of different rock formations. The reflected seismic energy is detected by a plurality of seismic receivers disposed at the surface, on the water bottom or in the water. The detected seismic energy is interpreted to infer, among other things, structure and composition of the rock formations below the surface or water bottom.

Seismic energy sources known in the art include "impulsive" sources. Impulsive sources impart seismic energy into the subsurface in short duration events, wherein in each event substantially all the seismic energy is generated at the same time. Impulsive sources include, among others, air guns, water guns, dynamite and weight drop devices.

Another type of impulsive seismic energy source known in the art uses electromagnets to lift a moveable reaction mass towards a top block composed of laminated magnetic steel, which rests on top of a frame. The reaction of lifting the mass towards the top block is transferred via the frame to a base plate in contact with the ground. The movable mass is caused to move when the electromagnet therein is actuated to cause attraction between the electromagnet and the top block above it. A limitation to the foregoing type of mass lift impulsive seismic source known in the art is that the magnetic attractive force between the electromagnet and the top block is inversely related to the distance between them. Thus, on actuation, the attractive force between the electromagnet on the movable mass and the steel top block is smallest. Therefore, the maximum distance that the movable mass may be disposed from the top block when the movable mass is at rest is limited. Since no force can be transmitted to the ground once the attracting surfaces of the moving mass and top block meet, the above distance limitation will impose an absolute limit on the active stroke of the device, and thus the maximum attainable ground movement caused by the base plate. Further, because the attractive force between electromagnet and top block increases as the distance therebetween is reduced, the movable mass tends to accelerate during its travel toward the top block, limiting the accuracy of timing of seismic impulses generated by the source. The output of the mass-lift source known in the art also tends to have substantial energy above the frequency range that is detectable from the subsurface. It is desirable to have an impulsive seismic source that has improved timing control and has the capability to control the frequency content of the energy output thereof.

SUMMARY OF THE INVENTION

A seismic energy source according to one aspect of the invention includes a base plate and a block fixedly coupled in a frame. The base plate is configured for contact with a part of the Earth's subsurface to be seismically energized. The frame has a first electromagnet associated therewith. A second electromagnet is disposed in a travelling reaction mass, which is movably disposed in the frame between the first electromagnet assembly and the top block. The reaction mass includes at least a third electromagnet associated therewith. The source has circuits for selectively energizing the first, second and at least a third electromagnets, and which are configured to energize the first and second electromagnets to repel each other such that the traveling reaction mass is lifted from the first electromagnet, and configured to energize the at least a third electromagnet after a selected delay time to cause attraction between the traveling reaction mass and the top block.

A method for seismic surveying according to another aspect of the invention includes generating a magnetic repulsive force between a fixed component in a source frame and a traveling reaction mass in the source frame to cause the traveling reaction mass to move upwardly. A magnetic attractive force is generated between the traveling reaction mass and a top block coupled to the source frame above it so as to cause the traveling reaction mass to accelerate upwards. Energy from the resulting downward movement of the frame is coupled into subsurface rock formations. Seismic energy reflected from the subsurface is detected.

Other aspects and advantages of the invention will be apparent from the following description and the appended claims.

DETAILED DESCRIPTION

Figure 1:
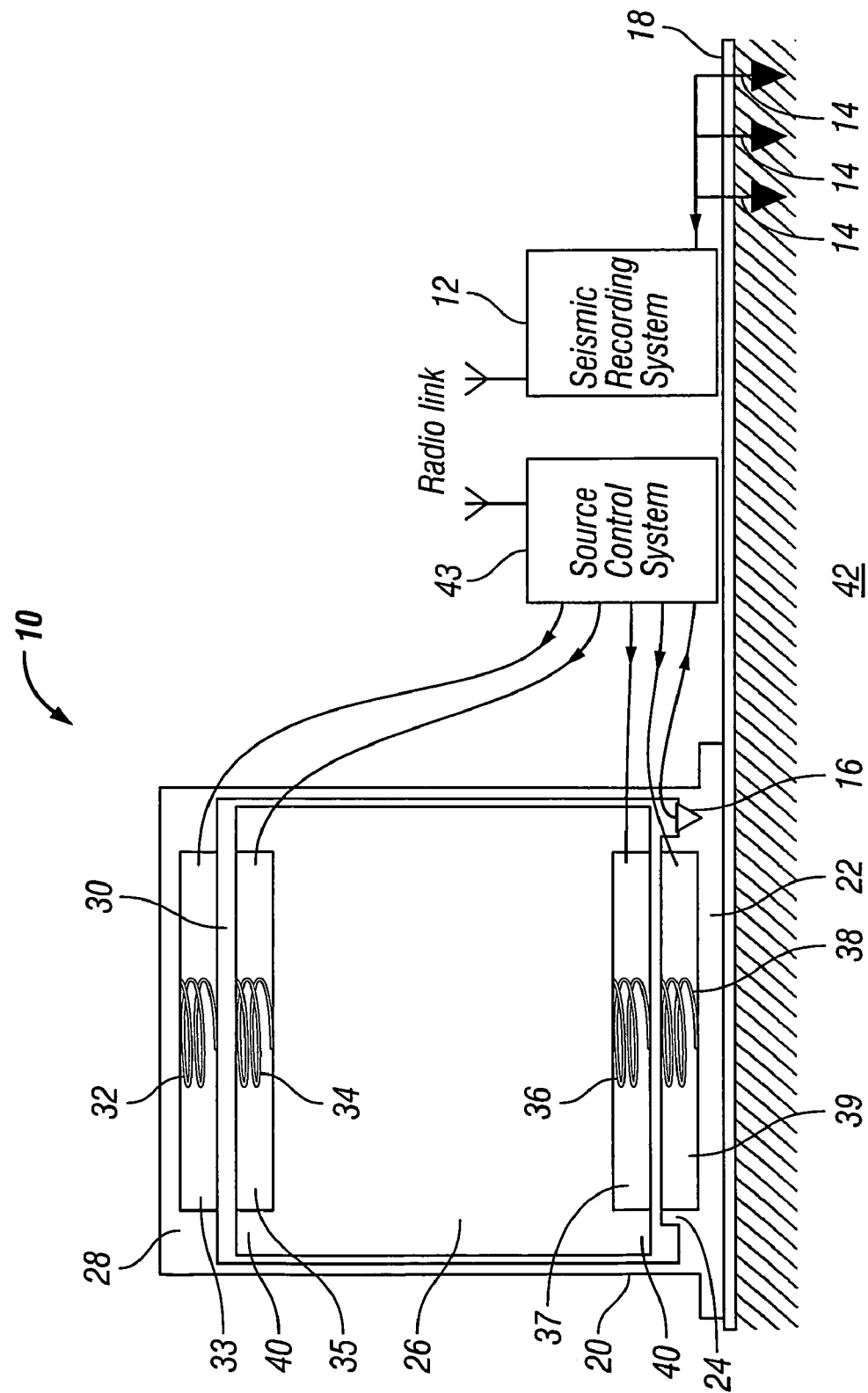
FIG. 1 shows an example seismic source and seismic receivers.

An example seismic acquisition system including a mass lift seismic energy source 10 according to the invention is shown schematically in FIG. 1. The source 10 is disposed at a selected position on the Earth's surface 18 (or in a body of water) above subsurface rock formations 42 to be evaluated. A plurality of seismic receivers 14 such as geophones, hydrophones or accelerometers may be disposed at spaced apart locations on the surface, in the body of water or on the bottom of the body of water above the subsurface rock formations 42. The receivers 14 generate electrical and/or optical signals in response to seismic energy detected from the subsurface formations 42. The signals generated by the receivers 14 may be conducted to a recording system 12. The recording system may include devices (not shown separately) for making a time indexed record of the signals detected by the receivers 14. The recording time is typically indexed to the actuation time of the seismic energy source 10.

The present example of the seismic energy source may include a baseplate 22 in contact with the ground surface 18. In other examples, the baseplate 22 may be configured to contact a body of water or the hull of a vessel (not shown) to impart energy into the water. The baseplate 22 has a selected mass and couples motion of certain other components of the source 10, explained below, to the ground (or water) to initiate seismic energy propagation into the subsurface. The baseplate 22 is affixed to a frame 20. A ferrous top block 28 may also be fixedly coupled to the frame 20, proximate the end opposed to that to which the baseplate 22 is affixed. A travelling mass 26 may be slidably supported in the frame 20 and may have a rest position on top of a first electromagnet assembly 39. The baseplate 22 may include a seismic sensor 16 coupled thereto to produce a signal corresponding to motion of the baseplate 22. The baseplate sensor 16 may be, for example, a geophone or accelerometer.

An electromagnet, which in the present example may be a first electromagnet assembly 39 may include a plurality of wire coils 38 disposed within a housing 24 fixedly coupled to the frame 20. The coils 38 may be wound to induce a magnetic field polarized along a direction parallel to the longitudinal dimension of the frame 20 when electric current is passed through the coils 38. The coils 38 may be energized at selected times by source control equipment (explained below with reference to FIGS. 4, 5 and 6) that may be disposed in the recording system 12. The first electromagnet assembly 39 may include magnetic flux closures 40 on the lateral ends thereof and proximate the bottom ends of the coils 38. The magnetic flux closures 40 may be made from ferrous or similar magnetically permeable material.

The travelling mass 26 may include a second electromagnet, in the form of an electromagnet assembly 37 including a plurality of wire coils 36 disposed generally on one side thereof (i.e., on the side facing the first electromagnet assembly 39), and in the present example may include a third electromagnet in the form of an electromagnet assembly 35 on the other side thereof (i.e., facing the top block 28), including a plurality of wire coils 34. The second 37 and third 35 electromagnet assemblies may include flux closures 40 on the lateral ends thereof, and extending between opposed faces of the second 37 and third 35 electromagnet assemblies. The second 37 and third 35 electromagnet assemblies each may be configured to induce a magnetic field polarized in a direction along the longitudinal dimension of the frame 20 when energized by the source control equipment (not shown in FIG. 1) at selected times. In some examples, the travelling mass 26 may include only one electromagnet rather than two as shown in FIG. 1.

The top block 28 may include a fourth electromagnet, in the form of an electromagnet assembly 33 shown including a plurality of wire coils 32. The wire coils 32 may be configured to generate a magnetic field polarized along a direction parallel to the longitudinal dimension of the frame 20 when energized. The fourth electromagnet assembly 33 may include flux closures 40 on the lateral ends and on ends of the coils 32 opposite to the ends proximate to travelling mass 26. The fourth electromagnet assembly 33 may be actuated at selected times by the source control equipment 43 and the recording system 12. The source 10 is shown in FIG. 1 close to its rest position, wherein the travelling mass 26 is spaced apart from the top block 28 by a predetermined space or gap 30, and the travelling mass 26 rests by gravity on the first electromagnet assembly 39.

Although not shown in FIG. 1, the wire coils in each of the four electromagnet assemblies may be wound about a laminated, magnetically permeable core to increase the magnetic flux but at the same time reduce the effects of eddy currents induced therein.

Figure 2:
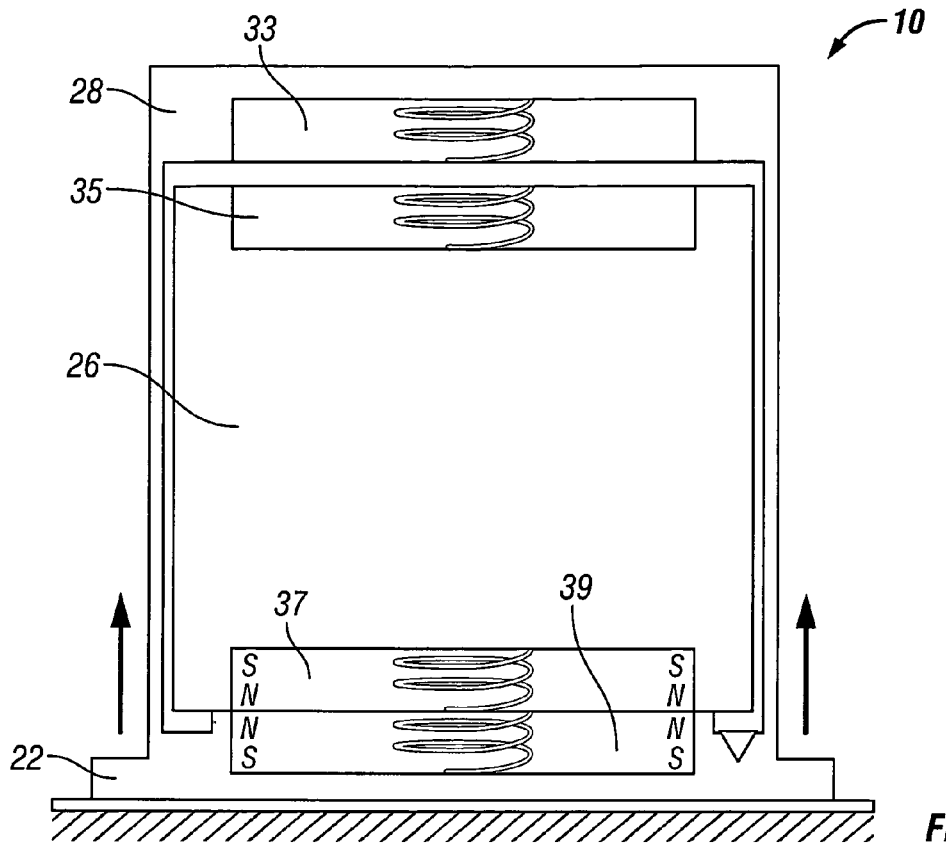
FIG. 2 is a functional block diagram of the seismic source shown in FIG. 1 to illustrate the operating principle thereof.

The principle of operation of the source 10 will now be explained with reference to FIGS. 2 and 3. In FIG. 2, the source 10 is shown at the moment of initiation of a seismic energy impulse. At such time, electric current may be passed through the coils (38 in FIG. 1) of the first electromagnet assembly 39. The first electromagnet assembly 39 may be energized so that its magnetic poles are as shown in FIG. 2, wherein a magnetic north pole is directed toward the upper end of the frame (20 in FIG. 1). The second electromagnet assembly 37 may be simultaneously energized by passing electric current through its coils (36 in FIG. 1) so that its magnetic poles are oriented in a direction opposite to that of the first electromagnet assembly 39. As shown in FIG. 2, like poles of the first 39 and second 37 electromagnet assemblies are directed toward each other, creating a repulsive force that lifts the travelling mass 26. Because at initiation of an impulse the travelling mass 26 is proximate the first electromagnet assembly 39, the repulsive force between the first 39 and second 37 electromagnet assemblies is greatest. Thus, the travelling mass 26 may be accelerated upward toward the top block 28.

Figure 3:
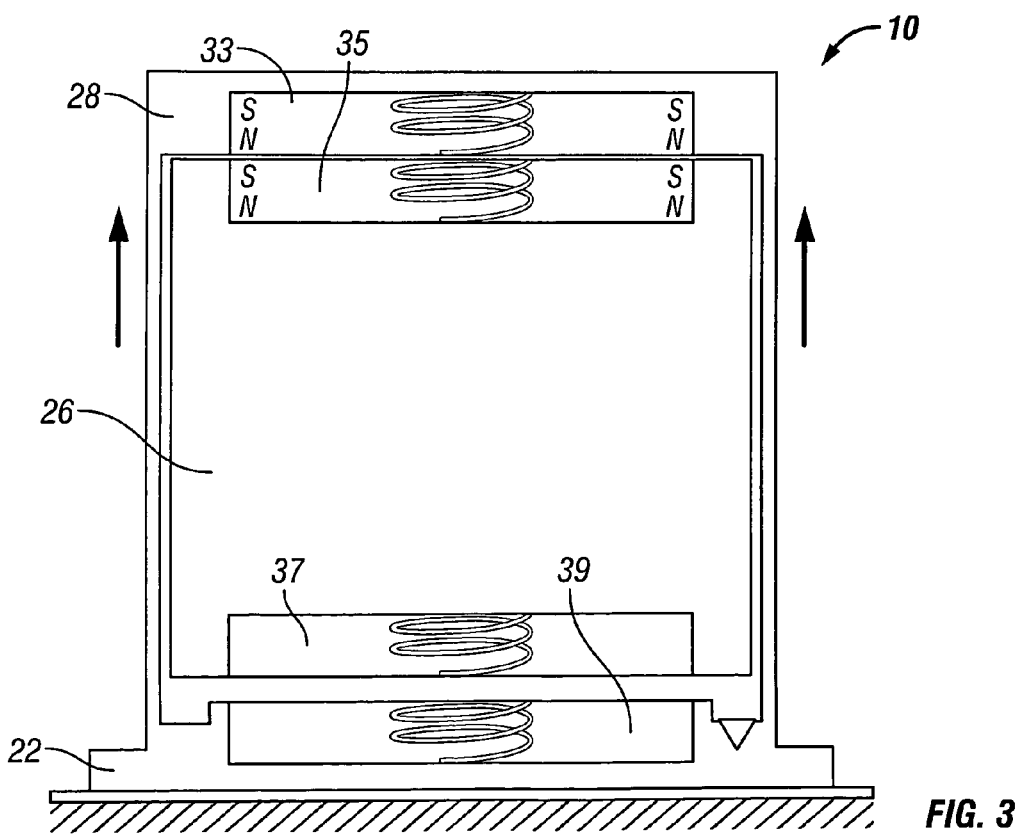
FIG. 3 shows the functional block diagram of FIG. 2 wherein a travelling mass is lifted from the first electromagnet assembly toward a top block.

At a selected time after actuation of the first 39 and second 37 electromagnet assemblies, and referring to FIG. 3, the first 39 and second 37 electromagnet assemblies may be switched off, and the third 35 and fourth 33 electromagnet assemblies may be actuated by passing electrical current through their respective wire coils. As shown in FIG. 3, the third 35 and fourth 33 electromagnet assemblies may be actuated such that opposed magnetic poles thereof are directed toward each other, thereby creating a magnetic attractive force. The magnetic attractive force continues the upward acceleration of the travelling mass 26 until it strikes the top block 28. The reactive force of the travelling mass 26 being accelerated upwards is transferred through the frame (20 in FIG. 1) into the baseplate 22, thereby initiating a seismic impulse into the subsurface. The downward movement of the frame 20 and base plate 22 will cease once the gap 30 has closed. The top block 28 may be constructed so that when the travelling reaction mass 26 strikes it, the top block will become free from the frame 20, in order not to adversely affect the downward impulse being imparted into the ground by the frame 20 and base plate 22.

The number of turns in each of the wire coils (FIG. 1), the number of such coils in each electromagnet assembly, the gauge of the wire used and a voltage applied to the coils when energizing each electromagnet should be selected such that repulsive force between the first 39 and second 37 electromagnet assemblies when energized is sufficient to move the travelling mass 26 upwardly toward the top block 28 at least one half the distance at rest (shown at 30 in FIG. 1) between the top block 28 and the travelling mass 26. Correspondingly, the foregoing parameters should be selected so that the attractive force between the third 35 and fourth 37 electromagnet assemblies when energized is sufficient to lift the travelling mass 26 from at least one half the distance at rest to cause it to strike the top block 28.

It will be appreciated by those skilled in the art that the traveling reaction mass 26 may include only one electromagnet (not shown) that is configured to magnetically polarize the entire reaction mass 26 along a single direction, instead of the two like-polarized electromagnets shown at 37 and 35. In such configuration, the single travelling mass electromagnet (not shown) may be energized once to correspond to energization of the first electromagnet 39 to cause repulsive force, and again to correspond to energization of the electromagnet 33 in the top block to cause magnetic attraction.

Figure 4:
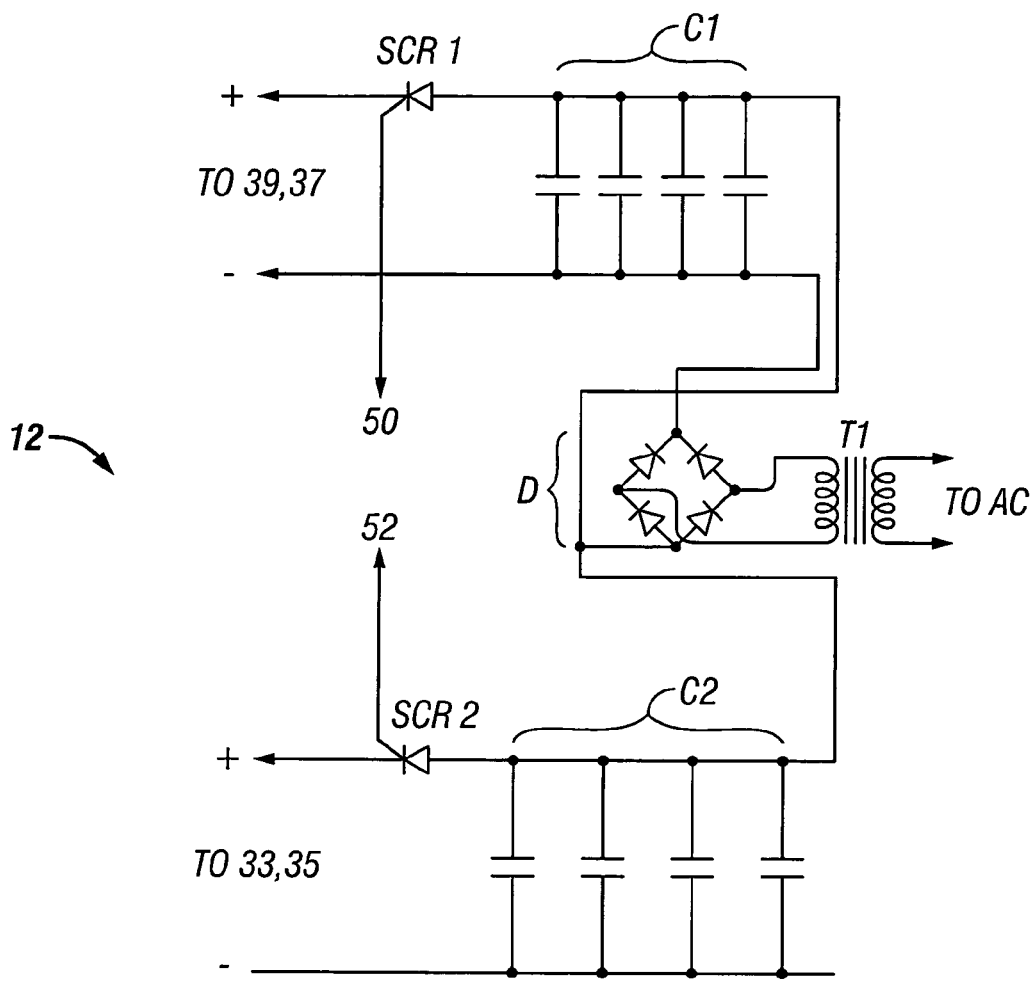
FIG. 4 shows an example actuation circuit for the electromagnets shown in FIG.

An example actuation circuit for the electromagnets to illustrate the principle of actuation is shown schematically in FIG. 4. The actuation circuit may form part of the recording unit 12, or may be located separately on the vehicle carrying the seismic source 10 and operated remotely. The actuation circuit may include a transformer Ti to change alternating current (AC) available in or to the recording unit 12 to a suitable value. AC may be rectified to using a full wave rectifier D. A capacitor bank C1, C2 for each of the first and second (39, 37 in FIG. 1) and third and fourth (35, 33 in FIG. 1) electromagnet assemblies may be provided to store electrical energy for actuation thereof. Current may be selectively applied to each pair of the electromagnet assemblies (e.g., the first and second, and the third and fourth) using an electronic switch such as a silicon controlled rectifier SCR1, SCR2 respectively. A firing signal may be applied at selected times to the gate 50, 52 of each of SCR1 and SCR2 to cause discharge of the respective capacitor banks C1, C2 through the respective first and second (39, 37 in FIG. 1) and third and fourth (35, 33 in FIG. 1) electromagnet assemblies. Other examples may include a respective capacitor bank and switch for each of the electromagnet assemblies.

Figure 5:
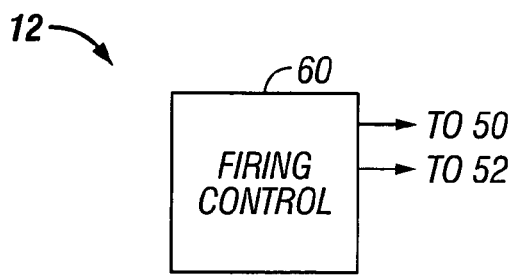
FIG. 5 shows an example firing control for the actuation circuit in FIG. 4.

FIG. 5 shows a firing control 60 in the source control system (43 in FIG. 1) that generates the appropriate signals conducted to the respective SCR gates (50, 52 in FIG. 4) to actuate the respective electromagnet assemblies.

Figure 6:
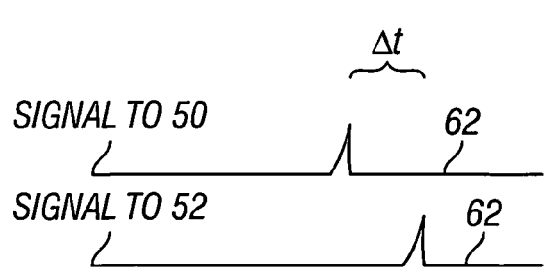
FIG. 6 is an example firing timing diagram.

FIG. 6 shows a timing diagram for the signals applied to the respective SCRs. A control signal such as a voltage pulse 60 may be transmitted to actuate the first and second electromagnet assemblies (39 and 37 in FIG. 1) at a first time, e.g., the voltage pulse may be sent to the gate of SCR1 in FIG. 4. Such control signal causes actuation of the first and second electromagnet assemblies as explained with reference to FIGS. 1 and 2 to cause the travelling mass (26 in FIG. 1) to begin moving toward the top block (28 in FIG. 1). After a selected delay time Δt, a control signal such as a voltage pulse 62 may be transmitted to actuate the third and fourth electromagnet assemblies (35 and 33 in FIG. 1). Actuation of the third and fourth electromagnet assemblies will cause the travelling mass (26 in FIG. 1) to be drawn toward the top block (28 in FIG. 1) as explained with reference to FIG. 3. In the present example, the delay time Δt may be selected to limit the uppermost frequency in the output of the seismic source (10 in FIG. 1) to a selected value. Increasing the delay time is expected to lower the uppermost frequency.

The time of the first control signal 60 may be used as a time index for recording signals generated by the seismic receivers (14 in FIG. 1). Alternatively, signals detected by the baseplate sensor (16 in FIG. 1) may be used as a time reference for seismic signal recording. For example, motion or acceleration of the baseplate (22 in FIG. 1) that exceeds a selected threshold may be used as a time index for signal recording. Signal recording may extend for a selected time interval after each actuation of the source (10 in FIG. 1) corresponding to the longest expected travel time of detectable reflected seismic energy from the subsurface.

A possible advantage of an impulsive seismic energy source as explained above is accuracy of actuation time with respect to the time of transmission of the control signals 60, 62. It is expected that the actuation time of the source (10 in FIG. 1) actually occurs within 300 microseconds of the transmission time of the control signals 60, 62. Such timing accuracy may enable deploying a plurality of sources configured as explained above. Because of the actuation time accuracy, it may be possible to deploy a plurality of such sources and actuate all of them at substantially the same instant in time. Such actuation may substantially increase the amount of seismic energy imparted into the subsurface formations (42 in FIG. 1), thereby increasing the signal to noise ratio of the seismic signals detected by the receivers (16 in FIG. 1).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic energy source, comprising:
    a base plate and a top block fixedly coupled in a frame, the baseplate configured for contact with a part of the Earth's subsurface to be seismically energized, the frame having associated therewith a first electromagnet assembly comprising a first electromagnet;
    a second electromagnet disposed in a travelling reaction mass, the traveling reaction mass movably disposed in the frame between the first electromagnet assembly and the top block, the reaction mass including at least a third electromagnet associated therewith; and
    circuits for selectively energizing the first, second and at least a third electromagnets, the circuits configured to energize the first and second electromagnets to repel each other such that the traveling reaction mass is lifted from the first electromagnet, the circuits configured to energize the at least a third electromagnet after a selected delay time to cause magnetic attraction between the traveling reaction mass and the top block.

2. The seismic energy source of claim 1 wherein the traveling reaction mass includes a fourth electromagnet, and wherein the circuits are configured to actuate the first and second electromagnets to repel each other and after a selected delay time to actuate the third and fourth electromagnets to attract each other such that the traveling reaction mass is drawn toward the top block.

3. The seismic energy source of claim 1 further comprising a seismic sensor coupled to the baseplate.

4. The seismic energy source of claim 1 wherein the delay time is selected to cause energy output of the source to have a selected upper frequency limit.

* * * * *